(12) United States Patent
Takahashi

(10) Patent No.: US 9,854,485 B2
(45) Date of Patent: Dec. 26, 2017

(54) MOBILE COMMUNICATION METHOD AND RADIO BASE STATION

(75) Inventor: Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/805,757

(22) PCT Filed: Jun. 20, 2011

(86) PCT No.: PCT/JP2011/064079
§ 371 (c)(1),
(2), (4) Date: Jan. 23, 2013

(87) PCT Pub. No.: WO2011/162214
PCT Pub. Date: Dec. 29, 2011

(65) Prior Publication Data
US 2013/0165123 A1    Jun. 27, 2013

(30) Foreign Application Priority Data
Jun. 21, 2010    (JP) .................... 2010-141107

(51) Int. Cl.
*H04W 36/00* (2009.01)
*H04W 24/02* (2009.01)
*H04W 16/32* (2009.01)
*H04W 84/04* (2009.01)

(52) U.S. Cl.
CPC ....... *H04W 36/0077* (2013.01); *H04W 24/02* (2013.01); *H04W 16/32* (2013.01); *H04W 84/047* (2013.01)

(58) Field of Classification Search
CPC ........... H04W 84/047; H04W 72/0406; H04W 24/02; H04W 72/0446; H04W 84/005; H04W 72/005; H04W 72/0426; H04W 16/26; H04W 28/16; H04W 92/045
USPC ............ 455/436, 443, 7, 13.1, 449; 370/408
See application file for complete search history.

(56) References Cited

U.S. PATENT DOCUMENTS

| 2008/0212516 | A1 | 9/2008 | Son et al. |
| 2010/0103845 | A1* | 4/2010 | Ulupinar et al. ............. 370/254 |
| 2011/0194484 | A1* | 8/2011 | Lee et al. ...................... 370/315 |
| 2011/0244851 | A1* | 10/2011 | Gunnarsson ............ H04W 8/26 455/423 |

(Continued)

FOREIGN PATENT DOCUMENTS

| EP | 2472920 A1 | 7/2012 |
| EP | 2605588 A1 | 6/2013 |
| EP | 2667525 A1 | 11/2013 |

(Continued)

OTHER PUBLICATIONS

3GPP ETSI TS 136 423 V.8.4.0 (Jan. 2009), pp. 1-20.*

(Continued)

*Primary Examiner* — Khalid Shaheed
(74) *Attorney, Agent, or Firm* — Osha Liang LLP

(57) ABSTRACT

A mobile communication method according to the present invention includes a step of notifying, by a radio base station DeNB, a radio base station eNB of identification information (PCI or ECGI) of cells #1 to #3 subordinate to a plurality of relay nodes RN#1 to #3 as identification information of a cell subordinate to the radio base station DeNB when the plurality of relay nodes RN#1 to #3 are connected to the radio base station DeNB.

2 Claims, 9 Drawing Sheets

(56) References Cited

U.S. PATENT DOCUMENTS

2011/0261747 A1* 10/2011 Wang et al. .................. 370/315

FOREIGN PATENT DOCUMENTS

| JP | 2007-053805 A | 3/2007 | | |
|----|---------------|--------|---|---|
| JP | 2010-056857 A | 3/2010 | | |
| JP | 2010-520674 A | 6/2010 | | |
| WO | WO 2009077418 A1 * | 6/2009 | ............. | H04W 8/26 |
| WO | 2011142579 A2 | 11/2011 | | |

OTHER PUBLICATIONS

International Search Report w/translation from PCT/JP2011/064079 dated Jul. 12, 2011 (4 pages).
Written Opinion of the International Searching Authority w/translation from PCT/JP2011/064079 dated Jul. 12, 2011 (8 pages).
International Preliminary Report on Patentability from PCT/JP2011/064079 dated Jan. 15, 2013 (5 pages).
Japanese Office Action w/translation from Application No. 2010-141107 dated Jul. 12, 2011 (5 pages).
Decision of Refusal w/translation from Application No. 2010-141107 dated Jan. 17, 2012 (5 pages).
3GPP TS 36.331 V10.1.0; "3rd Generation Partnership Project; Technical Specification Group Radio Access Network; Evolved Universal Terrestrial Radio Access (E-UTRA); Radio Resource Control (RRC); Protocol specification (Release 10)"; Mar. 2011 (290 pages).
3GPP TS 36.423 V9.3.0; "3rd Generation Partnership Project; Technical Specification Group Radio Access Network; Evolved Universal Terrestrial Radio Access Network (E-UTRAN); X2 application protocol (X2AP) (Release 9)"; Jun. 2010 (121 pages).
3GPP TS 36.423 V9.2.0; "3rd Generation Partnership Project; Technical Specification Group Radio Access Network; Evolved Universal Terrestrial Radio Access Network (E-UTRAN); X2 application protocol (X2AP) (Release 9)"; Mar. 2010 (120 pages).
3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (34 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).
Office Action in counterpart Russian Patent Application No. 2012157387107(090426), dated Jun. 17, 2014 (6 pages).
CATT, CMCC; "Discussion on necessity of X2 interface for Relay"; 3GPP TSG-RAN WG3 Meeting #66bis, R3-100308; Valencia, Spain; Jan. 18-22, 2010 (4 pages).
Office Action dated Sep. 8, 2014, in corresponding Canadian Application No. 2,803,374 (3 pages).
Extended European Search Report in counterpart European Patent Application No. 11798098.7, dated Mar. 19, 2015 (5 pages).
Office Action issued in corresponding Canadian Patent Application No. 2,803,374, dated Apr. 21, 2015 (4 pages).
Office Action in counterpart Canadian Patent Application No. 2,803,374, dated Nov. 4, 2015 (5 pages).
Office Action in counterpart European Patent Application No. 11798098.7, dated Nov. 26, 2015 (5 pages).
Office Action issued in corresponding European Application No. 11798098.7, dated Nov. 21, 2016 (5 pages).
Office Action in counterpart European Patent Application No. 11798098.7, dated Jun. 23, 2016 (6 pages).
Summons to Attend Oral Proceedings issued in the counterpart European Patent Application No.: 11798098.7, dated Jul. 19, 2017 (5 pages).

* cited by examiner

FIG. 3

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 to maxCellineNB | | | GLOBAL | reject |
| >Served Cell Information | M | | 9.2.8 | | - | - |
| >Neighbour Information | M | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503, ...) | Physical Cell Identifier of the neighbour cell | - | - |
| >>EARFCN | M | | 9.2.28 | DL EARFCN for FDD and EARFCN for TDD | - | - |
| Served Cells To Modify | | 0 to maxCellineNB | | | GLOBAL | reject |
| >Old ECGI | M | | ECGI 9.2.14 | This is the old E-UTRAN Cell Global Identifier | - | - |
| >Served Cell Information | M | | 9.2.8 | | - | - |
| >Neighbour Information | M | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503, ...) | Physical Cell Identifier of the neighbour cell | - | - |
| >>EARFCN | M | | 9.2.28 | DL EARFCN for FDD and EARFCN for TDD | - | - |
| >Deactivation Indication | O | | ENUMERATED(deactivated, ...) | Indicates that concerned cell is switched off for energy saving reasons | YES | ignore |
| Served Cells To Delete | | 0 to maxCellineNB | | | GLOBAL | reject |
| >Old ECGI | M | | ECGI 9.2.14 | This is the old E-UTRAN Cell Global Identifier of the cell to be deleted | - | - |
| GU Group Id To Add List | | 0 to maxPools | | | GLOBAL | reject |
| >GU Group H | M | | 9.2.20 | | - | - |
| GU Group Id To Delete List | | 0 to maxPools | | | GLOBAL | reject |
| >GU Group H | M | | 9.2.20 | | - | - |

FIG. 4

Served Cell Information

This IE contains cell configuration information of a cell that a neighbour eNB may need for the X2 AP interface.

| IE/Group Name | Presence | Range | IE type and reference | Semantics description | Criticality | Assigned Criticality |
|---|---|---|---|---|---|---|
| PCI | M | | INTEGER (0..503, ...) | Physical Cell ID | – | – |
| Cell ID | M | | ECGI 9.2.14 | | – | – |
| TAC | M | | OCTET STRING(2) | Tracking Area Code | – | – |
| Broadcast PLMNs | | 1..<maxnoofBPL MNs> | | Broadcast PLMNs | – | – |
| >PLMN Identity | M | | 9.2.4 | | – | – |
| CHOICE EUTRA-Mode-Info | M | | | | – | – |

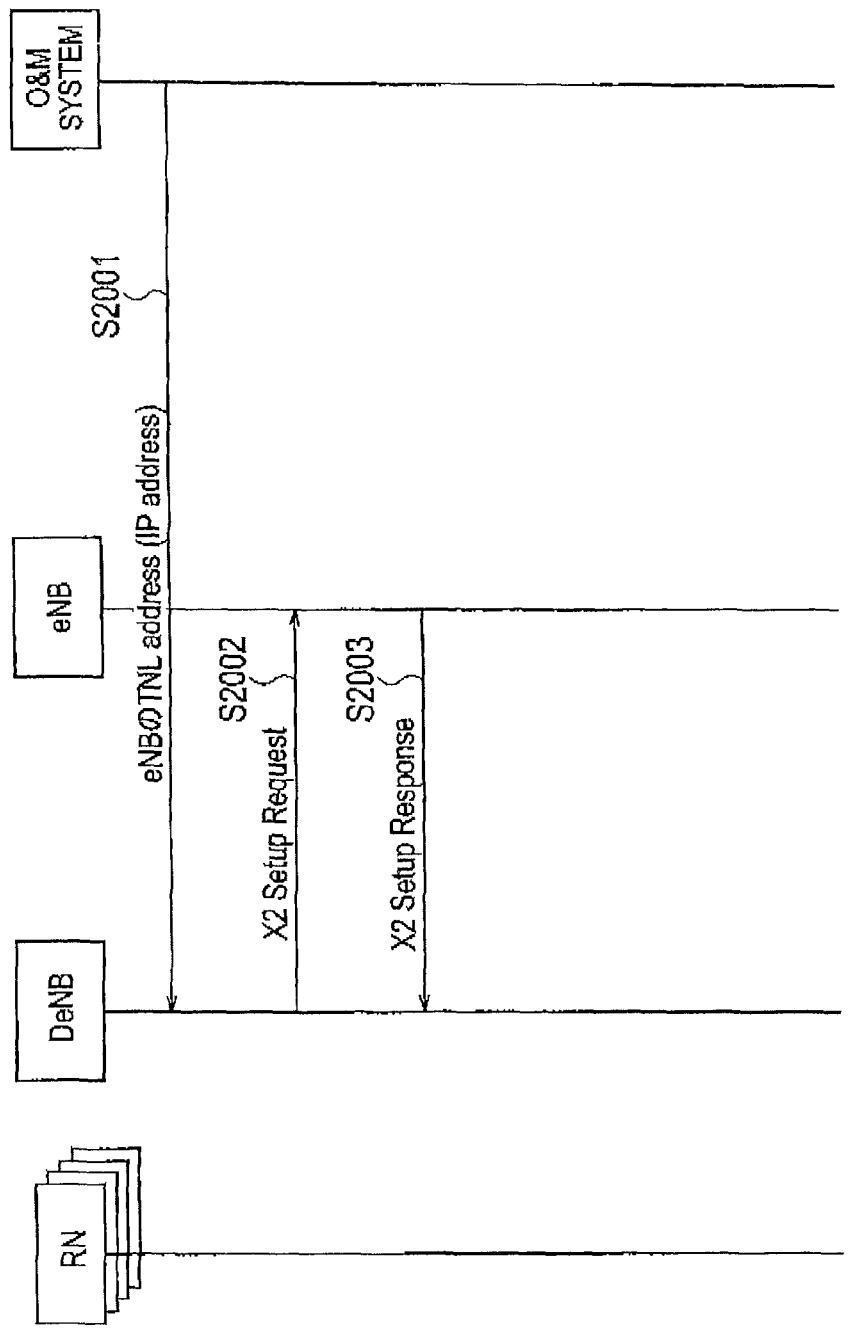

FIG. 6

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | – | – |
| >Neighbour Information | | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |
| GU Group Id List | | 0 to maxPools | | This is all the pools to which the eNB belongs to | GLOBAL | reject |
| >GU Group Id | M | | 9.2.20 | | – | – |

FIG. 8

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This is all the eNB cells | YES | reject |
| >Served Cell Information | M | | 9.2.8 | | - | - |
| >Neighbour Information | | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503, ...) | Physical Cell Identifier of the neighbour cell | - | - |
| >>EARFCN | M | | 9.2.26 | DL EARFCN for FDD and EARFCN for TDD | - | - |
| GU Group Id List | | 0 to maxPools | | This is all the pools to which the eNB belongs to | GLOBAL | reject |
| >GU Group Id | M | | 9.2.20 | | - | - |
| Criticality Diagnostics | O | | 9.2.7 | | YES | Ignore |

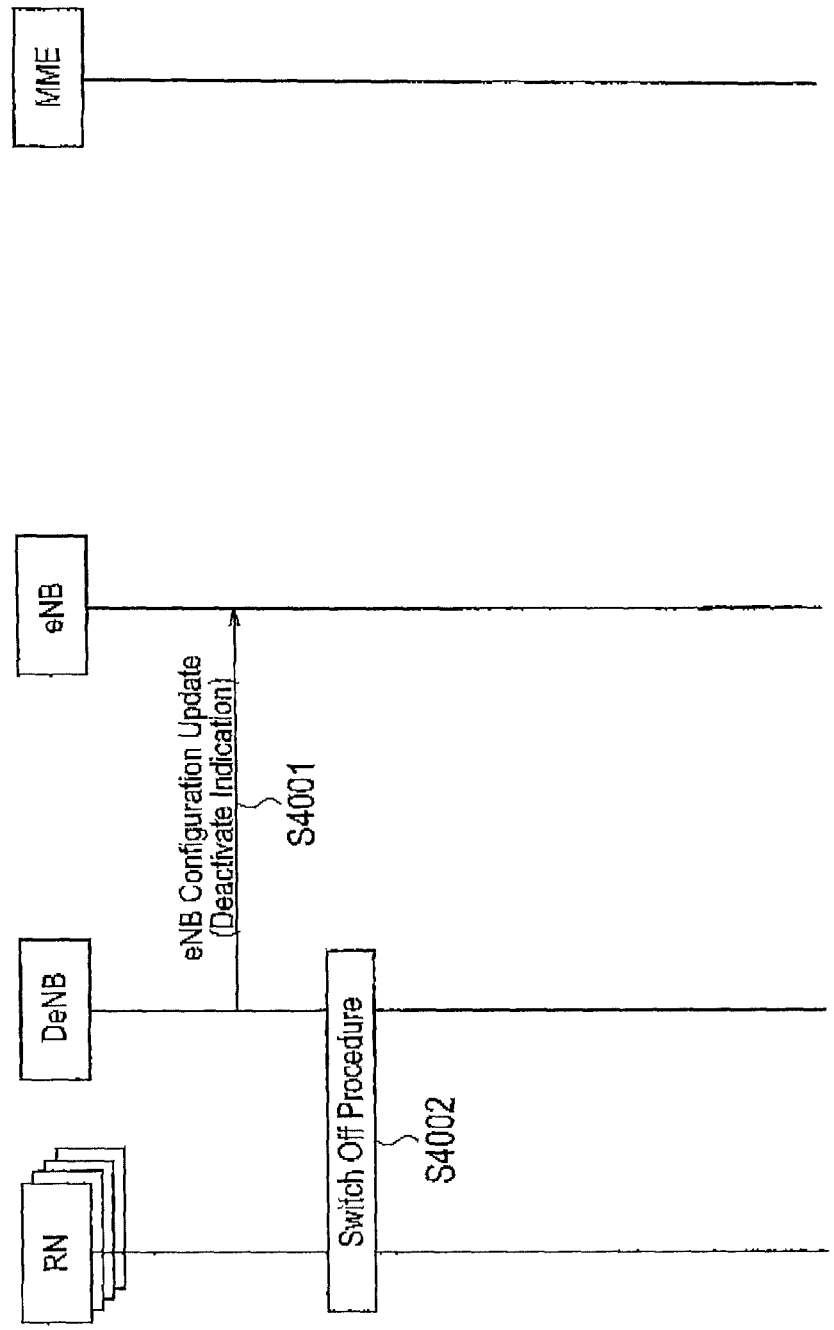

MOBILE COMMUNICATION METHOD AND RADIO BASE STATION

TECHNICAL FIELD

The present invention relates to a mobile communication method and a radio base station.

BACKGROUND ART

In an LTE (Long Term Evolution)-Advanced scheme, it is possible to use a relay node RN connectable to a radio base station DeNB (Doner eNB).

CITATION LIST

Non Patent Literature

[NPL 1] 3GPP TR36.806 (V9.0.0), "Evolved Universal Terrestrial Radio Access (E-UTRA); Relay architectures for E-UTRA (LTE-Advanced) (Release.9)", March, 2010

[NPL 2] 3GPP TS36.423 (V9.3.0), "Evolved Universal Terrestrial Radio Access Network (E-UTRAN); X2 application protocol (X2AP)", June, 2010

However, a case may be considered where in the LTE-Advanced scheme, a number of relay nodes RN are connected to one radio base station DeNB.

A radio base station eNB in an LTE mobile communication system establishes an "X2 interface" between the radio base station eNB and a neighboring radio base station eNB to exchange a handover control signal or load information of the radio base station eNB without undergoing a mobile switching center MME.

However, in an operational configuration in which a number of relay nodes RN are installed to be subordinate to the radio base station DeNB, when the relay node RN establishes an "X2 interface" between the relay node RN and all neighboring radio base stations eNB, it is concerned that process load of the radio base stations eNB may be increased.

In this regard, there has been proposed a method in which the radio base station DeNB concentrates an "X2 interface" between the radio base station DeNB and relay nodes RN subordinate to the radio base station DeNB, and establishes an "X2 interface" between the radio base station DeNB and a neighboring radio base station eNB independent of the number of the relay nodes RN subordinate to the radio base station DeNB.

However, when the neighboring radio base station eNB performs handover of a mobile station UE to a cell subordinate to the relay node RN subordinate to the radio base station DeNB, there is no clear indication what management information should be held or how such management information is to be created.

SUMMARY OF THE INVENTION

Therefore, the present invention has been achieved in view of the above-described problems, and an object thereof is to provide a mobile communication method and a radio base station, with which it is possible to create desired information in a radio base station eNB when a mobile station UE performs handover to a cell subordinate to a relay node RN.

A first characteristic of the present invention is summarized in that a mobile communication method includes: a step of notifying, by a first radio base station, a second radio base station of identification information of a cell subordinate to the one or a plurality of relay nodes as identification information of a cell subordinate to the first radio base station when the one or the plurality of relay nodes are connected to the first radio base station.

A second characteristic of the present invention is summarized in that a radio base station, to which one or a plurality of relay nodes are connected, is configured to notify a neighboring radio base station of identification information of a cell subordinate to the one or the plurality of relay nodes as identification information of a cell subordinate to the radio base station.

As described above, according to the present invention, it is possible to provide a mobile communication method and a radio base station, with which it is possible to create desired information in a radio base station eNB when a mobile station UE performs handover to a cell subordinate to a relay node RN.

BRIEF DESCRIPTION OF DRAWINGS

FIG. 3 is a diagram showing an example of "eNB Configuration Update" used in the mobile communication system according to the first embodiment of the present invention.

FIG. 4 is a diagram showing an example of an information element "Served Cell Information" of the "eNB Configuration Update" used in the mobile communication system according to the first embodiment of the present invention.

FIG. 5 is a sequence diagram showing an operation of the mobile communication system according to the first embodiment of the present invention.

FIG. 6 is a diagram showing an example of "X2 Setup Request" used in the mobile communication system according to the first embodiment of the present invention.

FIG. 8 is a diagram showing an example of "X2 Setup Response" used in the mobile communication system according to the first embodiment of the present invention.

FIG. 9 is a sequence diagram showing the operation of the mobile communication system according to the first embodiment of the present invention.

DESCRIPTION OF EMBODIMENTS

Mobile Communication System According to First Embodiment of the Present Invention With reference to FIG. 1 through FIG. 9, a mobile communication system according to a first embodiment of the present invention will be described.

Figure 1:
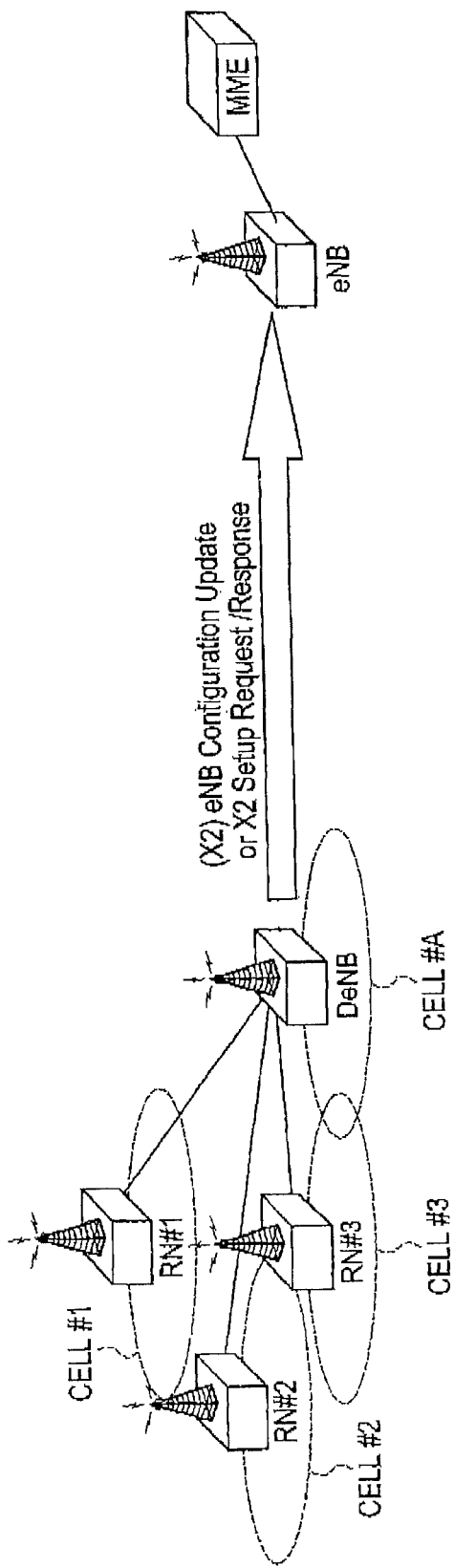
FIG. 1 is a diagram showing the entire configuration of a mobile communication system according to a first embodiment of the present invention.

The mobile communication system according to the present embodiment is an LTE-Advanced mobile communication system, and includes a mobile management node MME (Mobility Management Entity), a radio base station eNB, a radio base station DeNB, and relay nodes RN#1 to #3 as illustrated in FIG. 1.

In this system, it is assumed that the relay node RN#1 manages a cell #1, the relay node RN#2 manages a cell #2, the relay node RN#3 manages a cell #3, and the radio base station DeNB manages a cell #A.

Furthermore, the radio base station DeNB is configured to transmit "eNB Configuration Update", "X2 Setup Request", "X2 Setup Response" and the like to the neighboring radio base station eNB through an X2 interface (that is, an X2 signaling connection).

Note that it is sufficient if one X2 signaling connection is established between the radio base station DeNB and the radio base station eNB regardless of the number of the relay nodes RN connected to the radio base station DeNB.

Hereinafter, with reference to FIG. 2 through FIG. 9, the operation of the mobile communication system according to the first embodiment of the present invention will be described.

Figure 2:
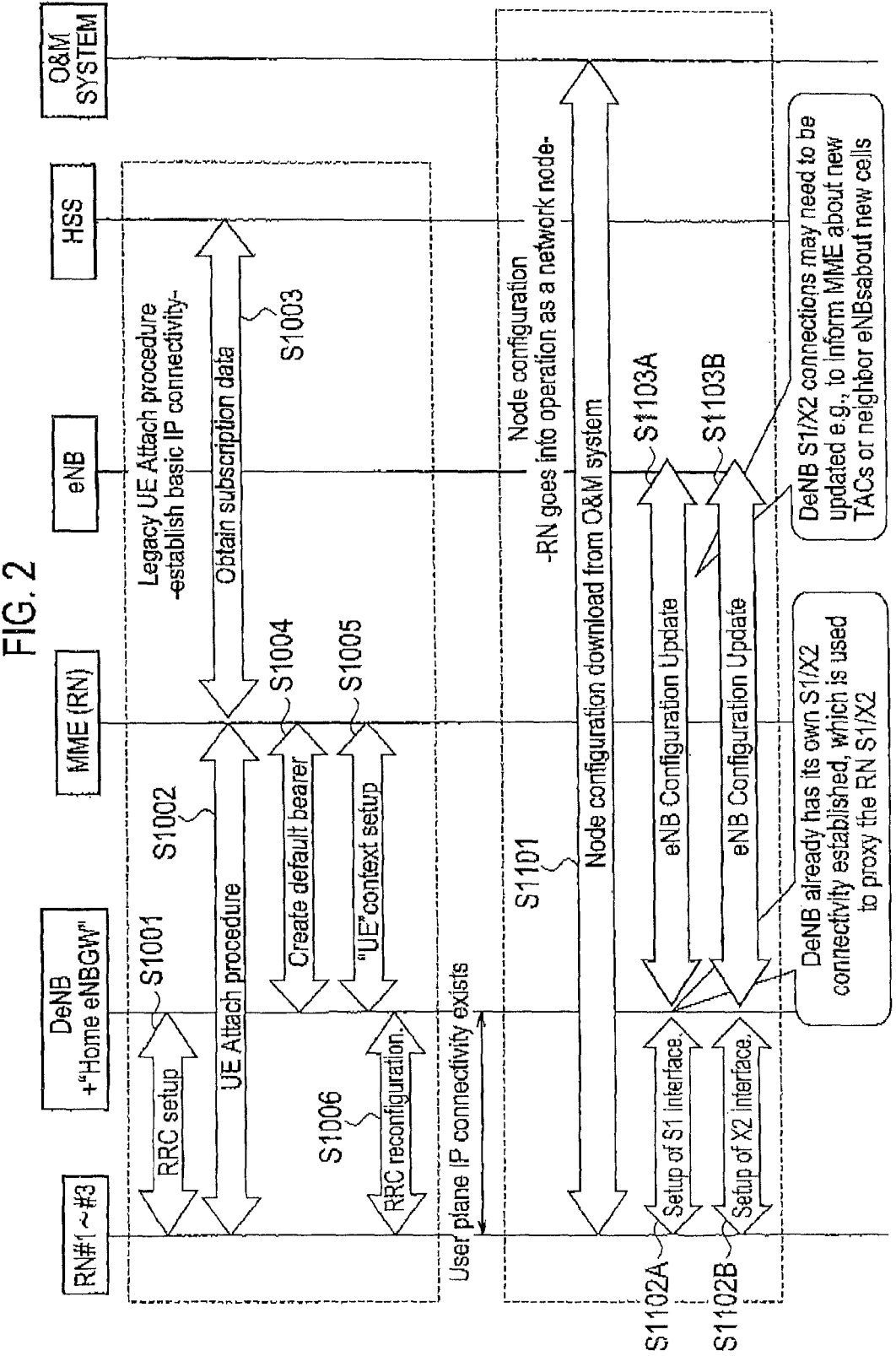
FIG. 2 is a sequence diagram showing an operation of the mobile communication system according to the first embodiment of the present invention.

Firstly, with reference to FIG. 2 through FIG. 4, a description will be provided for the operation of the mobile communication system according to the present embodiment when the radio base station DeNB notifies the radio base station eNB of identification information of the cells #1 to #3 subordinate to the relay nodes RN#1 to #3 through the "eNB Configuration Update".

As illustrated in FIG. 2, in step S1001, an "RRC setup" process is performed between the radio base station DeNB and the relay nodes RN#1 to #3.

In step S1002, a "UE Attach procedure" is performed between the relay nodes RN#1 to #3 and the mobile management node MME, and in step S1003, the mobile management node MME acquires subscriber data of the relay nodes RN#1 to #3 from a subscriber information management server HSS (Home Subscriber Server).

In step S1004, a default bearer for the relay nodes RN#1 to #3 is set between the mobile management node MME and the radio base station DeNB, and in step S1005, a UE context for the relay nodes RN#1 to #3 is set between the mobile management node MME and the radio base station DeNB.

In step S1006, an "RRC reconfiguration" process is performed between the radio base station DeNB and the relay nodes RN#1 to #3.

As a consequence, an IP connection of a U plane is established between the radio base station DeNB and the relay nodes RN#1 to #3.

In step S1101, the relay nodes RN#1 to #3 download "Node Configuration" from an O&M (Operation & Maintenance) system.

In step S1102A and S1102B, an S1 interface and an X2 interface are set between the radio base station DeNB and the relay nodes RN#1 to #3, and in step S1103A and S1103B, the radio base station DeNB transmits the "eNB Configuration Update" to the radio base station eNB.

Furthermore, the radio base station DeNB notifies the radio base station eNB of the identification information of the cells #1 to #3 subordinate to the relay nodes RN#1 to #3 as identification information of a cell subordinate to the radio base station DeNB through the "eNB Configuration Update".

Specifically, as illustrated in FIG. 3 and FIG. 4, the radio base station DeNB notifies parameters such as PCI (Physical Cell ID) and ECGI (Enhanced Cell Global ID) of the cells #1 to #3 subordinate to the relay nodes RN#1 to #3 through an information element "PCI" or "Cell ID" of an information element "Served Cell Information" of an information element "Served Cells To Add" of the "eNB Configuration Update".

In each figure, FIG. 3 illustrates an example of a format of the "eNB Configuration Update" defined in 3GPP TS36.423, and FIG. 4 illustrates an example of a format of the "Served Cell Information" defined in 3GPP TS36.423.

Note that when a new relay node RN is added, the radio base station DeNB is capable of notifying the radio base station eNB of the parameters such as PCI or ECGI of the relay node RN at an arbitrary timing through the information element "PCI" or "Cell ID" of the information element "Served Cell Information" of the information element "Served Cells To Add" of the "eNB Configuration Update".

Further, when the setting of an existing relay node RN is changed, the radio base station DeNB is capable of notifying the radio base station DeNB of parameters of the relay node RN after the change at an arbitrary timing through an information element of an information element "Served Cell Information" of an information element "Served Cells To Add" of "eNB Configuration Modify".

Still further, when the operation of an existing relay node RN is stopped, the radio base station DeNB is capable of notifying the radio base station DeNB of operation stop of the relay node RN at an arbitrary timing through "eNB Configuration Delete".

Secondly, with reference to FIG. 4 through FIG. 6, a description will be provided for the operation of the mobile communication system according to the present embodiment when the radio base station DeNB notifies the radio base station eNB of the identification information of the cells #1 to #3 subordinate to the relay nodes RN#1 to #3 through the "X2 Setup Request".

As illustrated in FIG. 5, in step S2001, the O&M system notifies the radio base station DeNB of a TNL (Transport Network Layer) address (for example, an IP address) of the radio base station eNB.

In step S2002, the radio base station DeNB transmits the "X2 Setup Request" to the radio base station eNB on the basis of the TNL address of the radio base station eNB.

Furthermore, the radio base station DeNB notifies the radio base station eNB of the identification information of the cells #1 to #3 subordinate to the relay nodes RN#1 to #3 as identification information of a cell subordinate to the radio base station DeNB through the "X2 Setup Request".

Specifically, as illustrated in FIG. 4 and FIG. 6, the radio base station DeNB notifies the parameters such as PCI or ECGI of the cells #1 to #3 subordinate to the relay nodes RN#1 to #3 through an information element "PCI" or "Cell ID" of an information element "Served Cell Information" of an information element "Served Cells" of the "X2 Setup Request".

In each figure, FIG. 6 illustrates an example of a format of the "X2 Setup Request" defined in 3GPP TS36.423.

Figure 7:
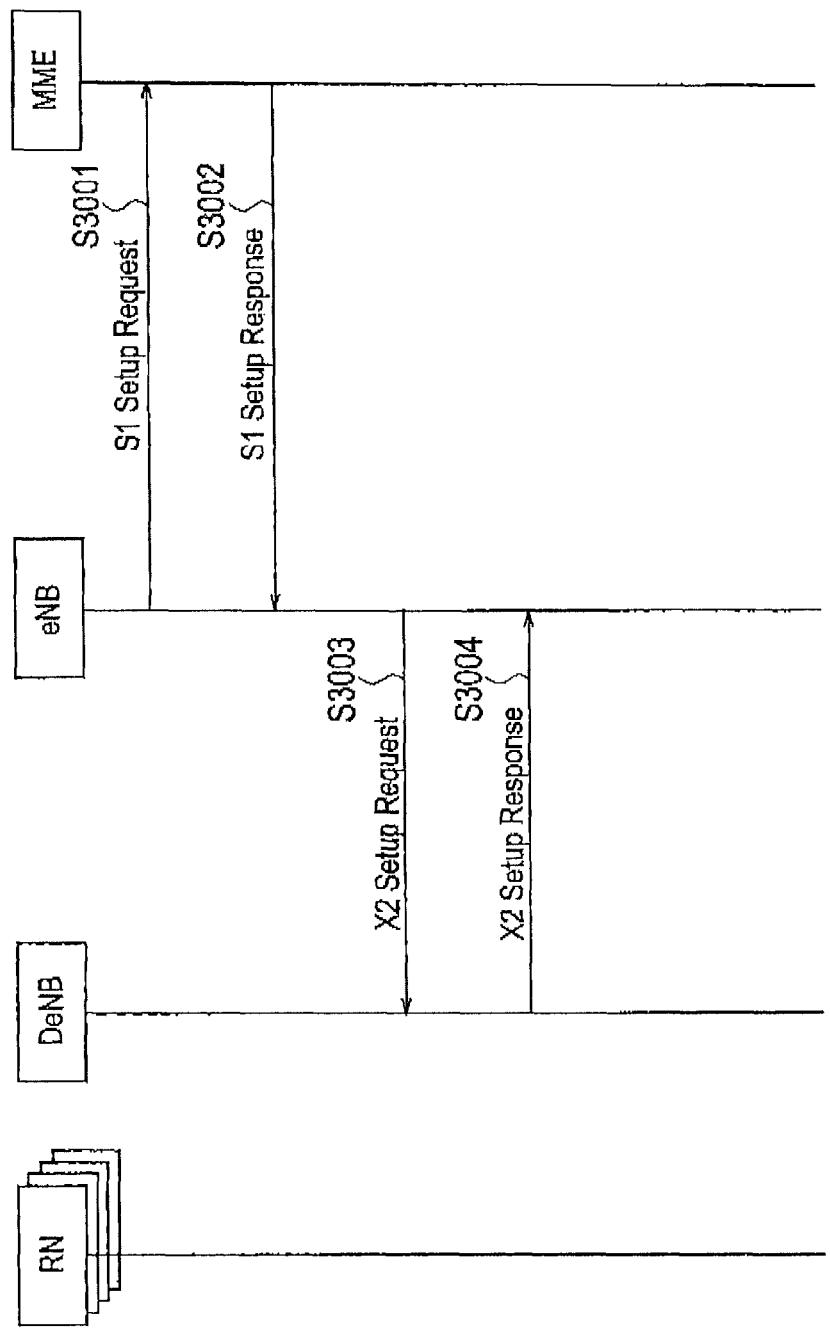
FIG. 7 is a sequence diagram showing the operations of the mobile communication system according to the first embodiment of the present invention.

Thirdly, with reference to FIG. 4, FIG. 7, and FIG. 8, a description will be provided for the operation of the mobile communication system according to the present embodiment when the radio base station DeNB notifies the radio base station eNB of the identification information of the cells #1 to #3 subordinate to the relay nodes RN#1 to #3 through the "X2 Setup Response".

As illustrated in FIG. 7, in step S3001, the radio base station eNB transmits "S1 Setup Request" to the mobile management node MME, and in step S3002, the mobile management node MME transmits "S1 Setup Response" to the radio base station eNB.

In step S3003, the radio base station eNB transmits the "X2 Setup Request" to the radio base station DeNB, and in step S3004, the radio base station DeNB transmits the "X2 Setup Response" to the radio base station eNB.

In this step, the radio base station DeNB notifies the radio base station eNB of the identification information of the cells #1 to #3 subordinate to the relay nodes RN#1 to #3 as identification information of a cell subordinate to the radio base station DeNB through the "X2 Setup Response".

Specifically, as illustrated in FIG. 4 and FIG. 8, the radio base station DeNB notifies the parameters such as PCI or ECGI of the cells #1 to #3 subordinate to the relay nodes RN#1 to #3 and the like through an information element "PCI" or "Cell ID" of an information element "Served Cell Information" of an information element "Served Cells" of the "X2 Setup Response".

In each figure, FIG. 8 illustrates an example of a format of the "X2 Setup Response" defined in 3GPP TS36.423.

Fourthly, with reference to FIG. 3 and FIG. 9, a description will be provided for the operation of the mobile communication system according to the present embodiment when the radio base station DeNB notifies the radio base station eNB of communication stop in the cells #1 to #3 subordinate to the relay nodes RN#1 to #3 through the "eNB Configuration Update".

As illustrated in FIG. 9, in step S4001, the radio base station DeNB notifies the radio base station eNB of the communication stop in the cells #1 to #3 subordinate to the relay nodes RN#1 to #3 through the "eNB Configuration Update".

Specifically, as illustrated in FIG. 3, the radio base station DeNB notifies the communication stop (for example, power OFF of the relay nodes RN#1 to #3) in the cells #1 to #3 subordinate to the relay nodes RN#1 to #3 through an information element "Deactivation Indication" of an information element "Served Cells To Modify" of the "eNB Configuration Update".

In step S4002, a procedure is performed between the radio base station DeNB and the relay nodes RN#1 to #3 to turn off the power of the relay nodes RN#1 to #3.

For example, the procedure is the same as a procedure for transitioning a state of a mobile station UE to an Idle state, or a procedure for Dettaching the mobile station UE.

In accordance with the mobile communication system according to the present embodiment, as viewed from the radio base station eNB, the cells #1 to #3 subordinate to the relay nodes RN#1 to #3 may be seen as cells subordinate to the radio base station DeNB, and therefore, it is possible for the radio base station eNB to reduce load for managing the cells #1 to #3 subordinate to the relay nodes RN#1 to #3.

The characteristics of the present embodiment as described above may be expressed as follows.

A first characteristic of the present embodiment is summarized in that a mobile communication method includes: a step of notifying, by a radio base station DeNB (a first radio base station), a radio base station eNB (a second radio base station) of identification information (PCI or ECGI) of cells #1 to #3 subordinate to a plurality of relay nodes RN#1 to #3 as identification information of a cell subordinate to the radio base station DeNB when the relay nodes RN#1 to #3 are connected to the radio base station DeNB.

In the first characteristic of the present embodiment, in the above-described step, the radio base station DeNB may notify the identification information of the cells #1 to #3 subordinate to the relay nodes RN#1 to #3 through "eNB Configuration Update".

In the first characteristic of the present embodiment, in the above-described step, the radio base station DeNB may notify the identification information of the cells #1 to #3 subordinate to the relay nodes RN#1 to #3 through "X2 Setup Response" transmitted in response to "X2 Setup Request" from the radio base station eNB.

In the first characteristic of the present embodiment, in the above-described step, when identification information (an IP address) of the radio base station eNB is received from a mobile management node MME, the radio base station DeNB may notify the radio base station eNB of the identification information of the cells #1 to #3 subordinate to the relay nodes RN#1 to #3 through "X2 Setup Request".

In the first characteristic of the present embodiment, in the above-described step, the radio base station DeNB may notify the radio base station eNB of information "Deactivate indication" indicating communication stop in the cells #1 to #3 subordinate to the relay nodes RN#1 to #3.

A second characteristic of the present embodiment is summarized in that a radio base station DeNB, to which a plurality of relay nodes RN#1 to #3 are connected, is configured to notify a neighboring radio base station eNB of identification information of cells #1 to #3 subordinate to the relay nodes RN#1 to #3 as identification information of a cell subordinate to the radio base station DeNB.

In the second characteristic of the present embodiment, the radio base station DeNB may be configured to notify the identification information of the cells #1 to #3 subordinate to the relay nodes RN#1 to #3 through "eNB Configuration Update".

In the second characteristic of the present embodiment, the radio base station DeNB may be configured to notify the identification information of the cells #1 to #3 subordinate to the relay nodes RN#1 to #3 through "X2 Setup Response" transmitted in response to "X2 Setup Request" from the radio base station eNB.

In the second characteristic of the present embodiment, when identification information of the radio base station eNB is received from a mobile management node MME, the radio base station DeNB may be configured to notify the radio base station eNB of the identification information of the cells #1 to #3 subordinate to the relay nodes RN#1 to #3 through "X2 Setup Request".

In the second characteristic of the present embodiment, the radio base station DeNB may be configured to notify the radio base station eNB of information "Deactivate indication" indicating communication stop in the cells #1 to #3 subordinate to the relay nodes RN#1 to #3.

Note that the operation of the mobile management node MME, the radio base station DeNB/eNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile management node MME, the radio base station DeNB/eNB, the relay node RN, or the mobile station UE. Furthermore, such a storage medium and processor may be arranged in the mobile management node MME, the radio base station DeNB/eNB, the relay node RN, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

RN . . . Relay node
DeNB, eNB . . . Radio base station
MME . . . Mobile management node

The invention claimed is:

1. A mobile communication method comprising:
    a step of notifying, by a first radio base station, a second radio base station of identification information including PCI (Physical Cell ID) and ECGI (Enhanced Cell Global ID) of a cell configured by one or a plurality of relay nodes by "eNB Configuration Update",
    wherein the first radio base station notifies the identification information of the cell configured by one or more of the relay nodes to the second base station, as identification information of the cell configured by the first radio base station, and the first radio base station acts as a donor base station via an X2 interface between the first radio base station and the one or the plurality of relay nodes,
    said step being initiated after setting of the X2 interface between the first radio base station and the one or the plurality of relay nodes, in a state where the X2 interface and one X2 signaling connection has been established between the first radio base station and the second radio base station, and
    wherein the second radio base station is not subordinate to the first radio base station.

2. A radio base station, wherein
    the radio base station is configured to notify a neighboring radio base station of identification information including PCI (Physical Cell ID) and ECGI (Enhanced Cell Global ID) of a cell configured by one or a plurality of relay nodes by "eNB Configuration Update",
    wherein the radio base station notifies the identification information of the cell configured by one or more of the relay nodes to the neighboring radio base station, as identification information of the cell configured by the radio base station, and the radio base station acts as a donor base station via an X2 interface between the radio base station and the one or the plurality of relay nodes,
    said notifying being initiated after setting of the X2 interface between the radio base station and the one or the plurality of relay nodes, in a state where the X2 interface and one X2 signaling connection has been established between the radio base station and the neighboring radio base station, and
    wherein the second radio base station is not subordinate to the first radio base station.

* * * * *